US 6,243,979 B1

(12) United States Patent
Seats et al.

(10) Patent No.: US 6,243,979 B1
(45) Date of Patent: Jun. 12, 2001

(54) PORTABLE RIFLE REST FOR USE WITH DEER STAND

(76) Inventors: Donald L. Seats, Route 2, Box 460, Pilot Mountain, NC (US) 27041; Bryan R. Surratt, 194 George Surratt Rd., Lexington, NC (US) 27295

( * ) Notice: Subject to any disclaimer, the term of this patent is extended or adjusted under 35 U.S.C. 154(b) by 0 days.

(21) Appl. No.: 09/163,586

(22) Filed: Sep. 30, 1998

Related U.S. Application Data (60) Provisional application No. 60/061,055, filed on Oct. 2, 1997.

(51) Int. Cl.[7] .................................................. F41A 23/18
(52) U.S. Cl. .............................. 42/94; 182/187; 182/135
(58) Field of Search ............................................... 42/94

(56) References Cited

U.S. PATENT DOCUMENTS

| | | | | |
|---|---|---|---|---|
| 2,847,906 | * | 8/1958 | Kester | 42/94 |
| 2,847,909 | * | 8/1958 | Kester | 89/40 |
| 3,022,898 | * | 2/1962 | Loeb | 211/64 |
| 4,230,203 | * | 10/1980 | Sweat et al. | 182/134 |
| 4,501,082 | * | 2/1985 | Phillips et al. | 42/94 |
| 5,105,908 | * | 4/1992 | Freund | 182/20 |
| 5,167,298 | * | 12/1992 | Porter | 182/187 |
| 5,279,390 | * | 1/1994 | Phillips | 182/187 |
| 5,482,137 | * | 1/1996 | McNeill | 182/187 |
| 5,492,198 | * | 2/1996 | Williams | 182/136 |
| 5,590,738 | * | 1/1997 | Hunt et al. | 182/116 |
| 5,628,383 | * | 5/1997 | McIntyre | 182/187 |
| 5,791,436 | * | 8/1998 | Talley, Sr. | 182/116 |

* cited by examiner

Primary Examiner—Michael J. Carone
Assistant Examiner—Denise J Buckley
(74) Attorney, Agent, or Firm—Robert W. Pitts (57) ABSTRACT

A combination hunting blind 2 and shooting or rifle rest 10 can be mounted on an elevated tree stand 4 by a hunter or occupant of the tree stand. The hunting blind 2 comprises the rifle rest 10 with a camouflage partition deployed around the front and the sides. The rifle rest 10 comprise a collapsible frame 26 the includes upright front posts 28, 30 and side horizontal rails 40, 42 attached to a front rail 32 by hinges whose axes are mutually perpendicular. The posts and side rails can be folded up so that they extend substantially in the same direction as a central section 34 of a C-shaped front rail 32. The rifle rest 10 is mounted on the tree stand 4 by a base support 14 that is bolted to the front edge of the tree stand. The posts 28, 30 are mounted on studs 20, 22 on the base support 14 and the side rails 40, 42 can be fastened to the tree by a rope ratchet or cargo strap 46 and stabilized by screws 56.

16 Claims, 6 Drawing Sheets

Fig. 8

PORTABLE RIFLE REST FOR USE WITH DEER STAND

CROSS REFERENCE TO PENDING PROVISIONAL APPLICATION

This application claims the benefit of Provisional Application 60/061,055 filed Oct. 2, 1997 entitled Elevated Hunting Blind with Shooting Rest.

BACKGROUND OF THE INVENTION

1. Field of the Invention

This invention is related to shooting rests, gun rests, rifle rests or shooting rails that will assist a hunter in aiming and discharging a firearm, especially when the hunter is in a tree stand.

2. Description of the Prior Art

Tree stands are commonly used by hunters, especially deer hunters. These tree stands are mounted at an elevated position in a tree and give a hunter a better field of view as well as positioning a hunter out of the normal line of sight of game animals, such as deer. Elaborate permanent or semipermanent tree stands complete with a permanent frame with railing arms surrounding an occupant are known, but these stands are both costly and difficult to mount at an elevated position. An opposite extreme is represented by self climbing tree stands that allow a hunter to ratchet the stand upwardly as he climbs the tree. However, these self climbing tree stands must also be lowered when the hunter descends. Another type of tree stand comprises a lower tree stand platform that is lashed or chained to a tree and ladders or steps attached to the tree allow the hunter to ascend or descend at will without removing the tree stand. These combo stands can be equipped with a seat. These relatively simple stands do not provide means for mounting a camouflage cover or partition hide an occupant from view. Furthermore not all of these intermediate stands include a shooting rest or rail to assist a hunter in aiming or discharging a firearm. Furthermore a hunter will typically remain in a tree stand at an elevated position for extended periods and since these stands may not have a permanent frame or railing, it is possible for a hunter to lose his balance and fall from the stand. Indeed safety belts can be used to secure the hunter directly to the tree.

U.S. Pat. No. 5,613,512 discloses a blind structure for use on a tree stand platform. This platform includes a seat that is chained to a tree and a platform below the seat includes an inner edge segment that forms an abutment which bears against a tree trunk. A camouflage blind is attached to the platform by inner and outer cross beams that can be removably secured to the tree stand platform. Sockets are attached to the ends of the inner and outer cross beams and rods, extending generally upward, are mounted in the sockets at four corners of the blind. Flexible blind panels can be inserted over the rods on the platform. Although the flexible blind panels provide a camouflage cover surrounding an occupant or hunter, they do not provide any frame for supporting a fire arm or for supporting an occupant or hunter to provide a measure of security, safety or a feeling of well being. U.S. Pat. No. 3,990,536 discloses a another blind structure with curtains wrapped around poles extending upwardly from the front, again without providing a shooting rest or a rigid rail at the top of the curtains.

U.S. Pat. No. 3,116,808 discloses a portable deer stand including a safety rail and a detachable closure. A closed tubular frame having substantially the same configuration as the perimeter of the stand platform is supported by two support posts at the outer or front end of the stand and is attached to a tree by a chain.

SUMMARY OF THE INVENTION

The invention depicted by the representative embodiments shown here comprises a rifle rest for use by a hunter that can be folded and collapsed from a deployed position in which the hunter can use the rifle rest for support and a retracted position for storage and transport. The rifle rest comprises a front bar having a central section and end sections extending transversely relative to the front bar. Two horizontal side bars are hinged about the end sections of the front bar. Two vertical posts are hinged relative to the central section, the posts being hinged at locations on the central section adjacent to the end sections. The two side and the two posts are hinged about mutually transverse axes so that the side bars and the posts can be retracted. The t bars, the side bars, the posts and the central section of the front bar extend in substantially the same direction when folded into a retracted configuration. This collapsible rifle or shooting rest can therefore be easily transported and stored and it can be deployed by a hunter on a tree stand to provide support for aiming and discharging a firearm along three sides. A camouflage partition can be positioned on the deployed rifle rest frame to form a hunting blind on and elevated tree stand. The frame can also be deployed on the ground to form a hunting blind.

This hunting blind includes a support base attachable to the tree stand platform at a location spaced from the tree. First and a second upright members are attachable to opposite ends of the support base and extend upwardly therefrom. A front horizontal member is attachable to the first and second upright members and extends between the first and second upright members. Side horizontal members extend from the upright members to fasteners attachable to opposite sides of the tree at a position above the tree stand platform. The hunting blink also includes a partition extending from the front and side horizontal members downward toward the tree stand platform to camouflage an occupant of the hunting blind.

The frame of the hunting blind also comprises a shooting rest for use on a tree stand platform mounted at an elevated position on a tree. The shooting rest includes a support base attachable to a front edge of the tree stand platform. The shooting rest also includes first and second posts insertable into opposite ends of the support base. A horizontal front shooting rail is attachable between the first and second posts with the posts supporting the shooting rail. Side rails are attachable to the front shooting rail and to the tree to support the front shooting rail. The posts, the front shooting rail and the side rails are mountable on and attachable to the tree stand platform by an occupant on the tree stand platform at the elevated position on the tree. Thus this invention provides either a shooting rest or a hunting blind that can be mounted on a conventional tree stand and can be relatively easily moved between tree stands or can be left in place for future use.

DETAILED DESCRIPTION OF THE PREFERRED EMBODIMENTS

Figure 1:
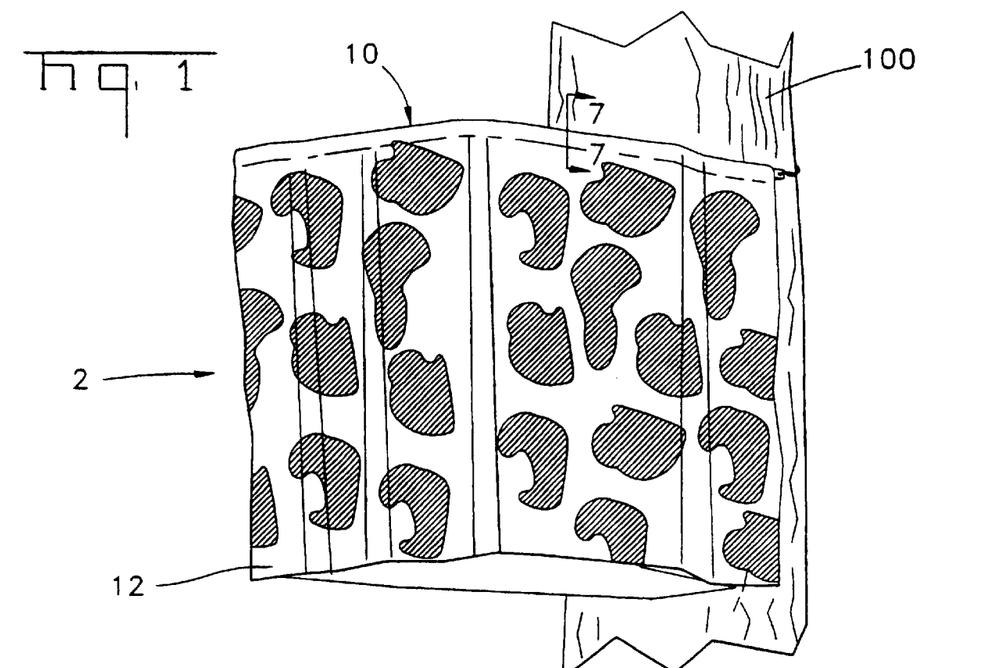
FIG. 1 shows a shooting rest according to the preferred embodiment of this invention deployed as an elevated hunting blind with a camouflage partition extending from the top of the shooting rest on the front and sides.
Figure 2:
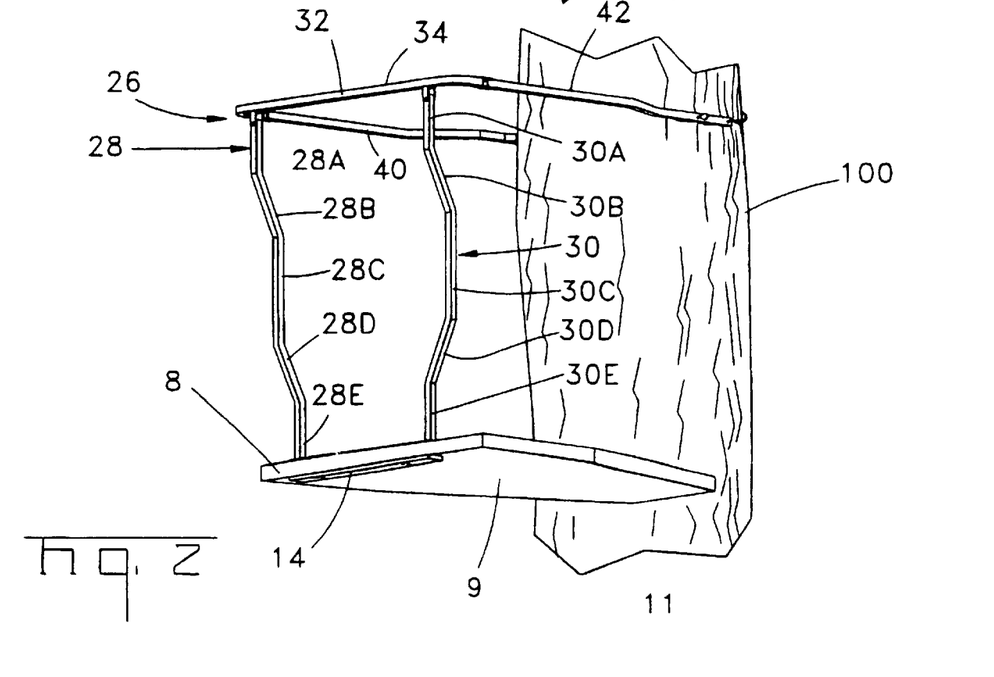
FIG. 2 is a view of the preferred embodiment of the shooting or rifle rest frame mounted on a tree stand located at an elevated position on a tree.
Figure 3:
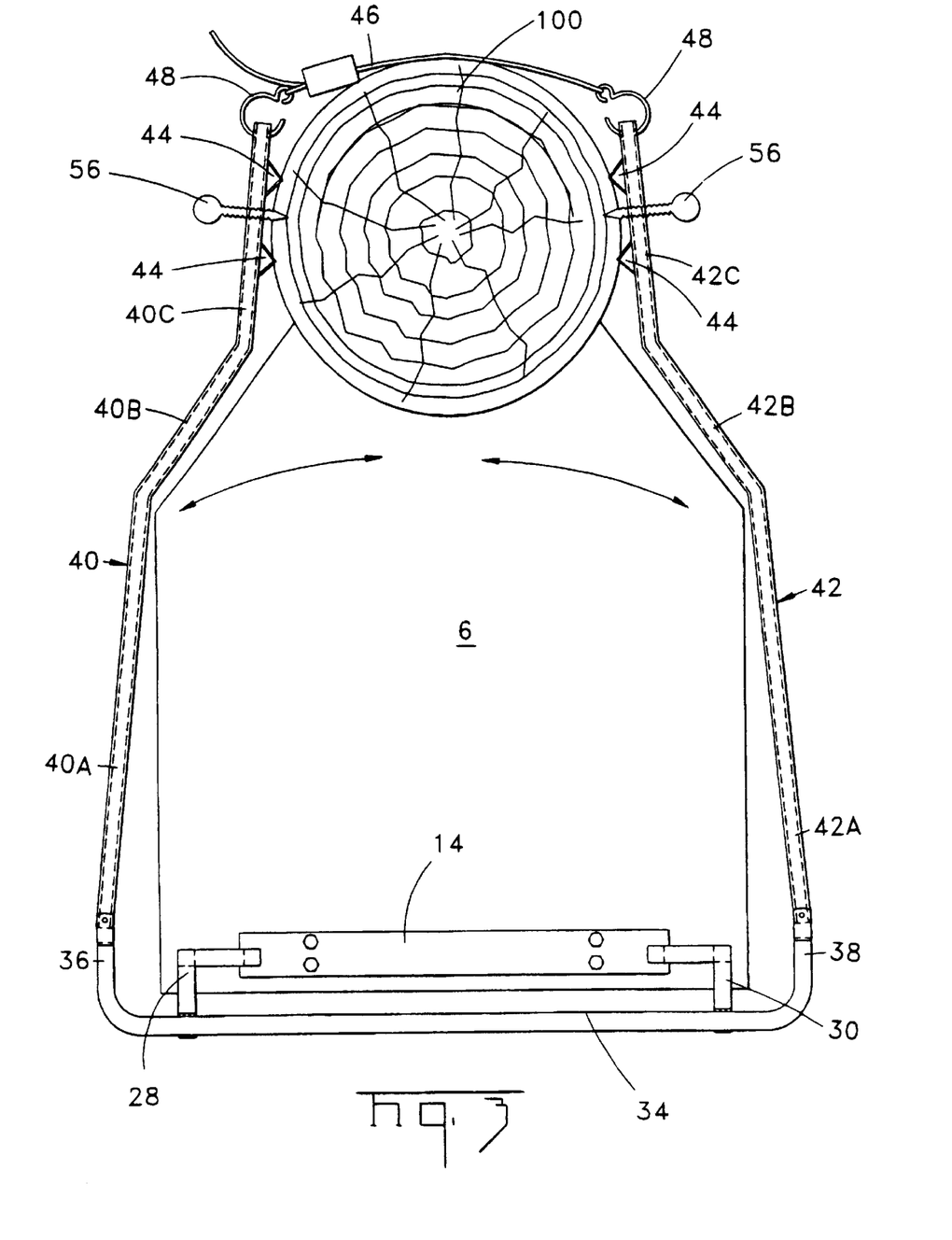
FIG. 3 is a top view of the shooting or rifle rest frame showing the manner in which the frame is mounted on a tree stand and secured to a tree.

FIGS. 1–7 depict the preferred embodiment of the hunting blind 2 and shooting or rifle rest 10 that can be employed on a tree stand 4 mounted on a tree 100. FIG. 1 shows the hunting blind 2 in the deployed configuration, and FIG. 2 shows the frame 26 of the shooting or rifle rest 10 in the deployed configuration. The hunting blind 2 comprises the shooting or rifle rest 10 with a camouflage partition 12 draped over the rifle rest 10 and surrounding the tree stand in which a hunter would be positioned. The shooting or rifle rest 10 comprises a rifle rest frame 26 mounted on a support base 14 with a foam sleeve 58 and camouflage sheath 60 surrounding portions of the shooting or rifle rest.

The tree stand 6 can be any of a number of conventional tree stands that can be mounted at an elevated position on a tree 100 for use by a deer hunter or similar outdoor sportsman. The hunting blind 2 and rifle rest 10 according to the preferred embodiments of this invention are typically used with tree stands that do not have an integral rifle rest. This rifle rest 10 can be employed on any conventional tree stand 4 on which a support base 14 can be mounted along the front edge 8 of the tree stand 4. Since all known tree stands can at least be modified to accept the support base 4, the shooting rest 10 and hunting blind 2 can be used with all tree stands that lack a rifle rest.

Figure 4:
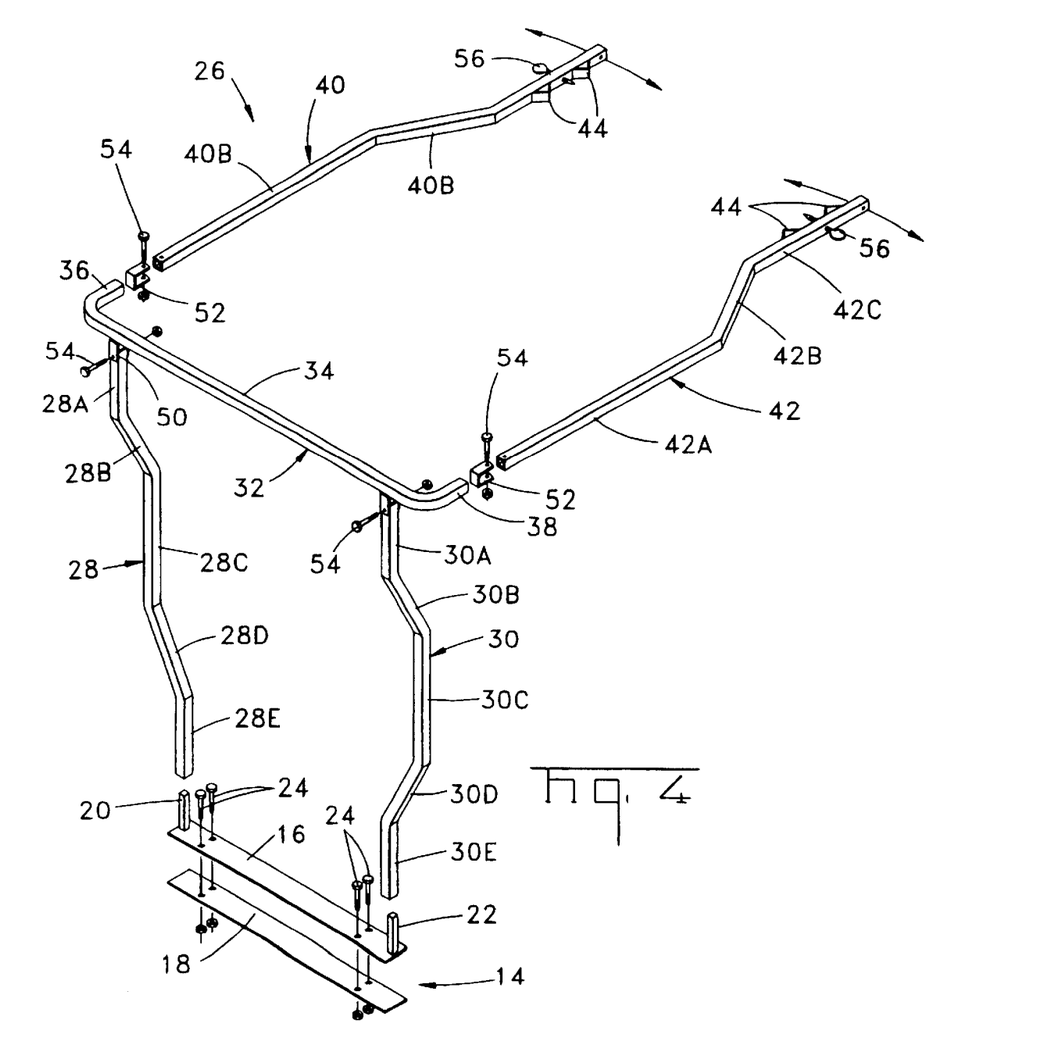
FIG. 4 is an exploded view of the shooting or rifle rest frame of FIGS. 2 and 3 showing the manner in which the components of the frame are assembled and connected to each other.
Figure 6:
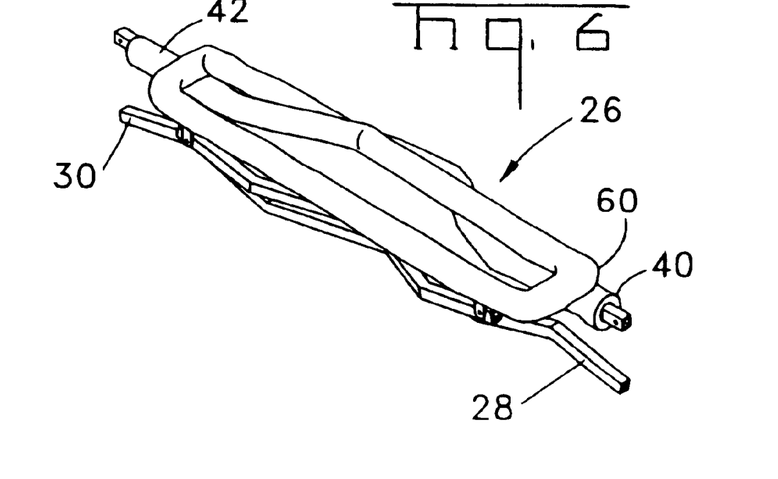
FIG. 6 is a view of the shooting or rifle rest with the main components in the retracted configuration for storage and shipment.

The support base 14, best shown in FIGS. 4 and 6, comprises an upper plate 16 and lower plate 18 that are bolted above and below the front edge 8 of a tree stand 4 by fastening bolts 24. Thus a tree stand need only provide clearance for the bolts 24, and if the tree stand does not provide such clearance, holes can be easily drilled into the tree stand. In should be understood that the bolts 24 represent only one means of attaching the support base 14 to the tree stand 4. Other conventional means, such as clamps could also be employed.

The upper support plate 16 also includes first and second studs 20 and 22 extending upwardly adjacent opposite ends of the upper support plate 16. In the preferred embodiment, these studs 20 and 22 comprise short sections of tubing, having a rectangular cross section, that are welded to the top of the upper support plate 16.

In addition to the support base 14, the shooting or rifle rest 10 also includes a front horizontal rail or bar 32, two upright supports or posts 28 and 30 and two horizontal side rails or bars 40 and 42. The cylindrical sleeve 58 and the camouflage sheath 60 that surround the front rail 32 and most of the two side rails 40 and 42 has been removed in FIGS. 2–5 to show the details of the frame assembly 26.

The frame 26 includes a first upright support member or post 28 and a second upright support member or post 28. As viewed in FIGS. 2 and 4, these comprise a left support post 28 and a right support post 30, which comprise mirror images of each other. Each post 28 and 30 is fabricated from metal tubing having a generally rectangular or square cross section. The inner dimensions of this tubing is at least sightly larger than the outer dimensions of the two studs 20 and 22 so that the posts 28 and 30 can be mounted on or inserted over the studs 20 and 22 respectively. In the preferred embodiment each front support post 28 and 30 includes five separate sections so that the tops of the posts 28 and 30 extend to a position in front of and beyond the corresponding studs 20, 22 at the base of the frame 26. The hunter or other occupant of the tree stand will therefore have additional room or space. Each post 28 and 30 comprises a continuous length of hollow metal tubing that is bent to form five adjacent sections. The rectangular tubing is bent in a conventional manner by indenting portions of the tubing adjacent the bends. In the preferred embodiment, the upper section 28A, 30A of each post comprises a vertical section. The second sections 28B, 30B comprise angled sections that are bent rearwardly relative to the top sections 28A, 30A. The central sections 28C, 30C adjacent to the rearwardly angled central section 28B, 30B comprise vertical sections that, on their lower ends, join inwardly angled sections 28D, 30D. The next adjacent bottom sections 28E and 30E are also vertical sections that have a length sufficient to receive studs 20, 22 when the posts 28, 30 are mounted on the support base 14. Although hollow metal tubing is used for fabricate the posts 28, 30 it should be understood that other embodiments of this invention could employ rods, plates, hollow cylindrical tubes, plastic sections or other equivalent members. However, the strength of the posts 28, 30 should be sufficient to support the weight of a firearm and of a hunter using the frame 26 as a rifle or shooting rest or an aid to aim a rifle, other firearm or a bow.

Frame 26 also includes a front horizontal shooting rail or bar 32 that is mounted at the top of the two front posts 28, 30. The front rail 32 comprises a C-shaped or U-shaped member having a central section 34 flanked by end sections or arms 36, 38 that extend transversely relatively toward the rear of the frame 26. In the preferred embodiment the arms 36 and 38 extend perpendicular to the front central section 34 and are joined to the central section be radiused portions of the front rail 32. In the preferred embodiment of this invention, the front rail 32 is also formed from a continuous length of hollow tubing having a rectangular or square cross section.

Two side horizontal members or rails 40, 42 are attached to the front rail 32 and extend rearwardly toward a tree 100 on which the frame 26 is mounted. Each side rail 40, 42 is also a continuous length of hollow metal tubing with a generally square cross section that has three sections. The front sections 40A, 42A extend generally rearward and join an angled section 40B, 42B which in turn joins a rear section 40C, 42C. These sections form an inwardly converging section that will allow the side rails 40, 42 to be attached to a tree 100 at the rear but will provide a wider space at the front of the rifle rest 10 and hunting blind 2. Although the front rail 32 is intended to be the primary rifle rest support, both of the side rails 40, 42 must have sufficient strength and rigidity to function as supports for a hunter or his firearm. Both of the side rails 40 and 42 included two spaced triangular projections or teeth 44 located adjacent to the rear or distal end of the side arms 40, 42. These teeth 44 provide means for gripping a tree or for aligning the side rails 40, 42 with the sides of the tree 100. A hole is located between adjacent teeth 44 on each side rail to receive a fastener or screw 56 that is used to firmly secure the side rail to the tree so that the frame 26 and the rifle rest 10 will be firmly anchored to the tree 100 so that the rifle rest will be rigidly supported by the tree.

The two front posts 28 and 30 and the two side rails 40, 42 are attached to the front horizontal rail 32 by hinges that permit the posts 28, 30 and the side rails 40, 42 to be folded relative to the front rail 32. These hinges permit the frame 26 to be positioned in the deployed configuration shown in FIG. 2 or in the collapsed configuration shown in FIG. 6. When the frame 26 is folded into the collapsed configuration shown in FIG. 6, the front posts 28, 30 as well as the side rails 40, 42 all extend in the same general direction as the central section 34 of the front rail 32. In this configuration the frame 26 is not only relatively compact, but it is easy to hold and transport. The collapsed frame 26 can also be lifted into an elevated tree stand 4 by a hunter as he climbs the tree on which the stand is mounted.

Figure 5:
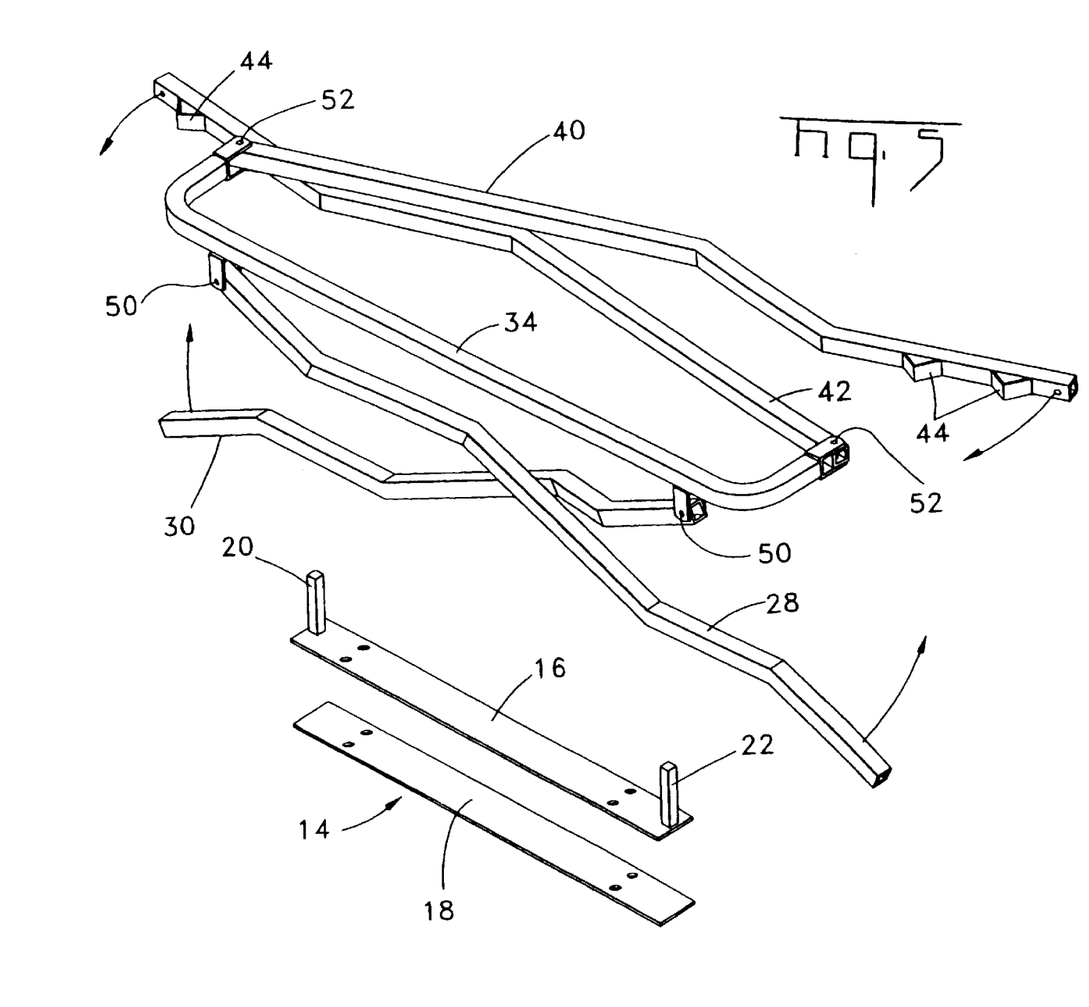
FIG. 5 is a view showing the manner in which the shooting or rifle rest frame is folded or collapsed to a retracted position for transport and storage.

The manner in which the posts 28, 30 and the side rails 40, 42 can be folded or pivoted into the deployed or the collapsed configurations can best be seen in FIG. 5, which shows the frame 26 in an intermediate position. As shown in FIGS. 4 and 5, the two posts 28, 30 are each attached adjacent opposite ends of the front rail central section 34 by hinge flanges 50 which are generally U-shaped yoke or clevis. In the preferred embodiment of this invention, the hinge flanges 50 are welded to the front rail central section. A hinge pin 54 extends through aligned holes in the hinge flanges 50 and in the proximate ends of the posts 28, 30. The axis of this hinge extends perpendicular to the front rail central section 34 and in a substantially horizontal plane. When the posts 28, 30 are folded into the collapsed configuration they will be located in a plane generally parallel to the plane of the front rail 32 and each post 28, 30 will extend in substantially the same direction as the front rail central section 34.

The side rails 40, 42 are also attached to the front rail by hinge flanges 52, which are of substantially the same construction as the hinge flanges 50. These hinge flanges 52 are welded onto the ends of the front rail end sections or arms 36, 38. Hinge pins 54 connect the side rails 40, 42 to the front rail is the same manner as the pivoted connection between the front rail 32 and the posts 28, 30. Hinge flanges 52 are however welded or otherwise attached to the ends of the arms 36, 38 so that the axis of these hinges extends perpendicular to the front rail central section 34 and end arms 36, 38 and in a substantially vertical direction. The axis about which the side rails 40, 42 pivot is substantially perpendicular to the axis about which the posts 28, 30 pivot. However, because of the C-shaped or U-shaped configuration of the front rail 32, the side rails will extend generally parallel to the front rail central section 34 as well as the posts 28, 30 in the collapsed configuration.

The hinge flanges 52 attaching the side rails 40, 42 to the front rail 32 permit each side rail 40, 42 to pivot through angles of substantially greater than ninety degrees. Thus the side rails 40, 42 can not only be folded into the collapsed configuration, but also moved outward from the position shown in FIG. 2 to permit the hunter or occupant to enter and or exit the tree stand 4 form either side. When positioned in the deployed configuration of FIG. 3, the side rails 40, 42 can either be secured to a tree 100 by the fastener screws 56 or be a flexible strap 46 that is attached to ends of the side rails 40, 42 by rings 48 which extend through holes in the side rails 40, 42. When this strap 46 is wrapped around the tree 100, it will hold the side rails 40, 42 in place. Of course this strap, which can be cinched up by a conventional ratcheting mechanism, will not rigidly secure either side rail 40, 42 to the tree 100. Typically the strap 46 will be used to hold one of the side rails 40, 42 in place when the tree stand 4 is unoccupied. When the tree stand 4 and hunting blind 2 is occupied, the rails 40, 42 should each be screwed to the tree, both to provide a stable platform for resting or aiming a firearm and to provide additional safety. Although the side rails 40, 42 and the front rail should provide additional security for an occupant, the rifle rest 10 should not be relied upon as a primary restraint and an occupant should still employ a separate safety strap.

Figure 7:
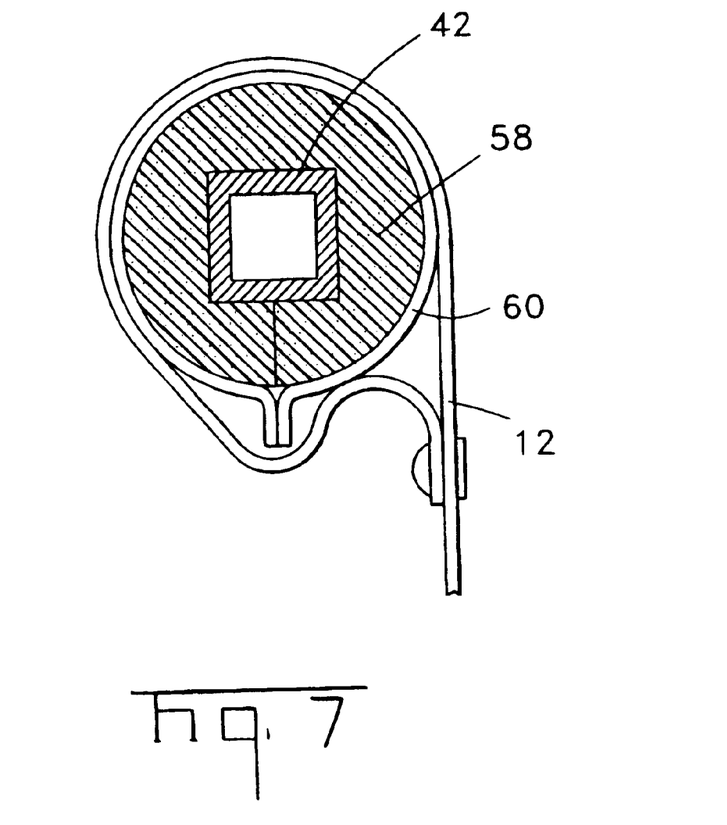
FIG. 7 is a section view taken along section lines 7—7 in FIG. 1 showing the cylindrical sleeve surrounding the rectangular tubing forming the frame, with a sheath surrounding the tubing and with the camouflage partition draped over the sleeve and sheath.

This hunting blind 2 and shooting rest 10 can be easily transported by one person from the ground to the elevated tree stand 4, and it can be assembled or disassembled by one person while on the elevated tree stand 4. The support base 14 and the camouflage partition or canopy 12 can be secured to the collapsed frame, shown in FIG. 6, by the strap 46 and this assembly can easily be moved to the elevated tree stand or removed when the hunter wishes to move it to another location. Once the hunter is in position on the tree stand, the base support plates 16, 18 are disconnected and mounted on the top and bottom of the tree stand 4 by bolts 24. The frame 26 can then be placed in the deployed configuration by folding the posts 28, 30 and the side rails 40, 42. The front posts 28, 30 are then inserted over the studs 20, 22. The side rails can then be secured to the tree 100 by either the strap 46 or the screws 56. The partition or canopy 12 can then be deployed about the front rail 32 and side rails 40, 42 using snaps as shown in FIG. 7. In this configuration, the partition serves to cover the occupant of the tree stand and the cylindrical sleeve, comprising a foam material, provides a compliant rest surface.

Figure 8:
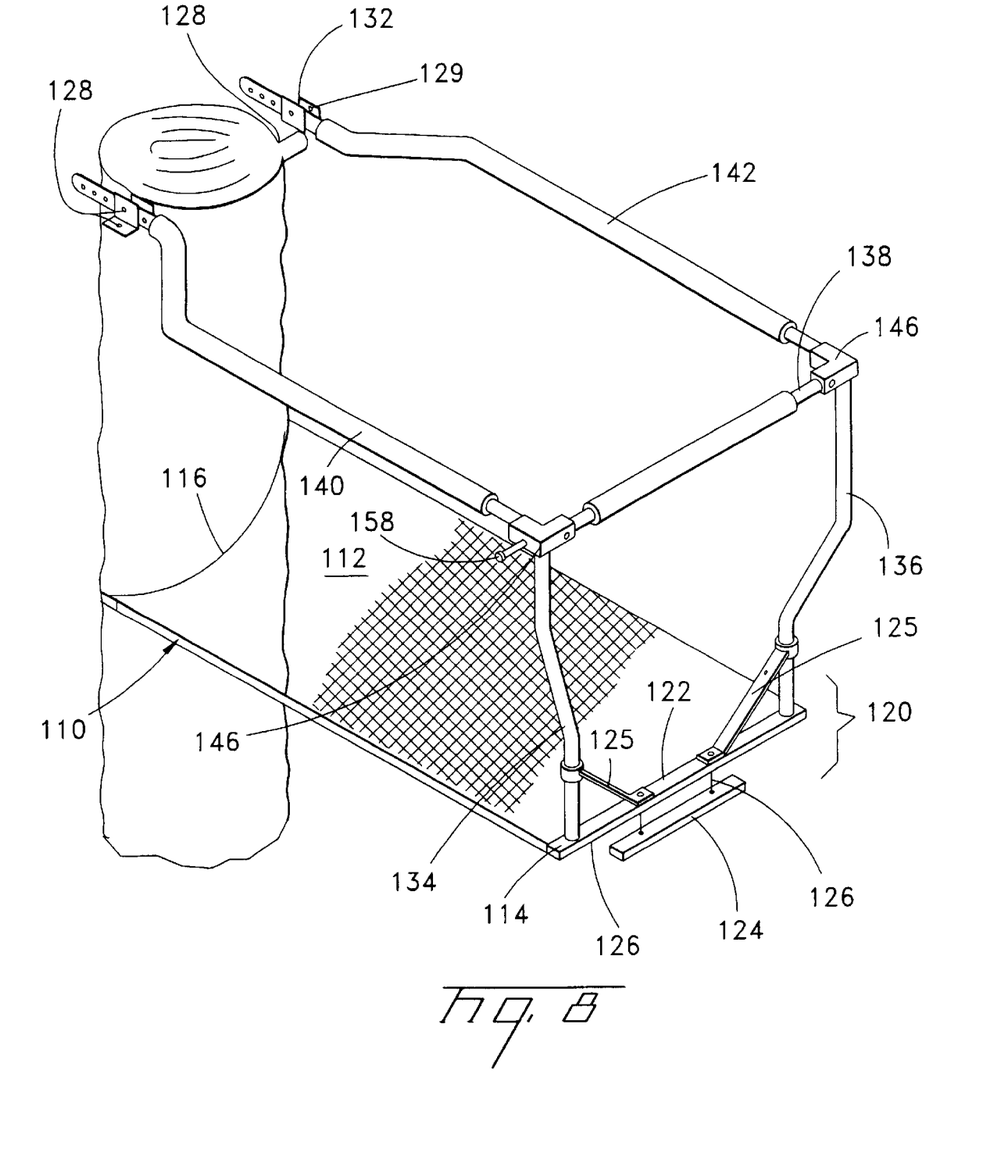
FIG. 8 is a view of an alternate embodiment of the shooting or rifle rest in which the frame components comprise separate members.

An alternate embodiment of a hunting blind or shooting rest in accordance with the broader aspects of this invention is shown in FIG. 8. This alternate embodiment employs separate member that can be assembled together instead of the hinged assembly of FIGS. 1–7. The frame of the hunting blind shown in FIG. 8 is attached to the front edge 114 of the tree stand platform 112 by a support base 120 that includes and upper clamping bar 122 and a lower clamping bar 124. The upper clamping bar 122, that is positioned on the top of the tree stand platform 112, is secured to the bottom clamping bar 124, positioned below the front edge 114 of platform 112, by clamping bolts 126 that extend through the aligned holes. The top clamping bar 122 also includes support holes located at either end. Two upright posts 134 and 136 are inserted into these support holes on the sides of the platform 112. These upright posts 134 and 136 can also be supported by angled braces 125 that are secured to the support base 120 by the clamping bolts. The upright posts 134 and 136 are hollow tubes of aluminum or other inexpensive material that still is strong enough to provide a rigid stable support at the front of the hunting blind. As shown in FIG. 8, these upright posts 134 and 136 are bent or angled outwardly so that the top of the posts 134 and 136 are spaced further apart than the bottom when the posts are positioned in the support base 120. This provides additional space for the occupant of the hunting blind.

Three horizontal members or rails are supported along the top of the hunting blind by the upright posts 134 and 136. A front horizontal member or rail 38 extends between the tops of the upright posts 134 and 136 and will provide the principal outwardly facing shooting rest or rail for a hunter. Two side horizontal members or rails 140 and 142 extend from the intersection between the front horizontal member 138 and respective upright posts 134 and 136 to the rear of the hunting blind where the side members 140 and 142 are attached to opposite sides of the tree at the rear of the hunting blind. The front horizontal member 138 and the side horizontal members 140 and 142 are also fabricated using metal tubing, which like the upright posts 134 and 136 can have a diameter of approximately one inch. The side horizontal members 140 and 142 are attached to the front horizontal member 138 and to the respective upright posts 134 and 136 by connector brackets 146 on each end of the front horizontal member 138. Fasteners 128, affixed on opposite sides of the circumference of the tree attach the rear ends of the side members 140 and 142 to the tree at the rear of the stand. This rigid attachment of the side horizontal members 140 and 142 serves to further stabilize the frame and the front horizontal member 138. The side horizontal member 140 and 142 are wider at their front ends than at their rear ends where the side horizontal members are attached to the tree. This provides additional space for the occupant. It should also be understood that the side horizontal members 140 and 142 are flexible so that the rear ends can be attached to trees of different diameters. The preferred embodiment of this invention can be used on trees with diameters from approximately 6 inches to 18 inches.

The same front connector bracket 146 can be used on either side of the front horizontal member 138. Connector bracket 146 includes a central cylindrical member or rod that includes a hole extending through the center of the rod adjacent its top. The outer diameter of rod is small enough to fit within the open top of the upright members 134 and 136 and the connector bracket 146 is secured to the top of the upright posts 134 and 136 by a cotterless pin inserted through aligned holes in the posts and the rod. The rod is located at the apex of two channels and that are formed by walls spaced apart by a distance that is slightly greater than the outside diameter of the rod and more importantly slightly greater than the outside diameter of the front horizontal member 138 and the side horizontal members 140 and 142. Holes extend through the walls of channel and adjacent the distal ends of these channels. With the connector bracket 146 mounted on the top of an upright post 134 or 136, the front horizontal rail 138 is inserted into the front channel and a pin is inserted through a hole in the front horizontal rail that is aligned with the channel hole. In this manner the front rail 138 can be inserted into a downwardly facing channel and attached to the posts 134 and 136 at both ends. The side rails 140 and 142 are attached to the connector bracket 146 in the same manner as the front rail 138 by inserting the respective side rail into the channel extending rearwardly at a right angle with respect to the front rail 138. This provides a stable connection between the front rail 138, the posts 134 and 136 and the side rails 140 and 142.

Fasteners 128 that attach the rear ends of side rails 140 and 142. These fasteners 128 each include a threaded portion that can be screwed into the side of the tree in much the same manner that screw in tree steps are mounted on a tree. A rail support channel 132 extends perpendicular to the screw threaded portion, and this fastener support channel 132 is formed by side walls that are spaced sufficiently far enough apart to permit the rear end of a respective side rail 140 or 142 to be inserted into the channel 132. The channel walls include holes that are in alignment and one of the holes at the rear end of the side rail can be aligned with these holes so that a pin can be inserted through aligned holes. Multiple holes are provided in the rear side rail end so that trees of different diameters can be accommodated.

The two embodiments depicted herein are intended to be representative of the invention. Other embodiments would be apparent to one of ordinary skill in the art and without departing from the invention as represented by these two embodiments. The invention is of course defined by the following claims and is not limited to the representative embodiments depicted herein.

We claim:

1. A rifle rest for use by a hunter that can be folded and collapsed from a deployed position in which the hunter can use the rifle rest for support and a retracted position for storage and transport, the rifle rest comprising:

a front bar having a central section and end sections extending transversely relative to the front bar:

two first bars hinged about the end sections of the front bar;

two second bars hinged relative to the central section, the second bars being hinged at locations on the central section adjacent to the end sections;

the two first bars and the two second bars being hinged about mutually transverse axes so that the first bars and the second bars can be retracted so that the first bars, the second bars and the central section of the front bar extend in substantially the same direction when folded into a retracted configuration.

2. The rifle rest of claim 1 wherein the first bars comprise side bars and the second bars comprise upright supports.

3. The rifle rest of claim 2 wherein the two side bars and the two upright supports are hinged about mutually perpendicular axes.

4. The rifle rest of claim 3 wherein the end sections of the front bar extend perpendicular to the central section of the front bar.

5. The rifle rest of claim 2 wherein the two side bars are folded into an overlapping relationship when positioned in the retracted configuration.

6. The rifle rest of claim 5 wherein the two upright supports are folded into an overlapping relationship when positioned in the retracted configuration.

7. The rifle rest of claim 2 wherein the side bars can pivot through an angle of greater than ninety degrees.

8. The rifle rest of claim 2 wherein the upright supports included multiple sections extending at angles relative to adjacent sections.

9. The rifle rest of claim 8 wherein each upright support includes at least one rearwardly extending section and at least one inwardly extending section.

10. The rifle rest of claim 2 wherein the front bar, the side bars and the upright supports are all formed from tubing having a generally rectangular cross section.

11. A hunting blind for use with a tree stand mounted on a tree, the hunting blind being mountable on a tree stand platform, the hunting blind comprising:

a support base attachable to the tree stand platform at a location spaced from the tree;

first and second upright members attachable to opposite ends of the support base and extending upwardly therefrom;

a front horizontal member attachable to the first and second upright members and extending between the first and second upright members;

side horizontal members extending from the upright members to fasteners attachable to opposite sides of the tree at a position above the tree stand platform; and a partition extending from the front and side horizontal members downward toward the tree stand platform to camouflage an occupant of the hunting blind.

12. A shooting rest for use on a tree stand platform mounted at an elevated position on a tree, the shooting rest comprising:

a support base attachable to a front edge of the tree stand platform;

first and second posts insertable into opposite ends of the support base;

a horizontal front shooting rail attachable between the first and second posts with the posts supporting the shooting rail; and side rails attachable to the front shooting rail and to the tree to support the front shooting rail;

the posts, the front shooting rail and the side rails being mountable on and attachable to the tree stand platform by an occupant on the tree stand platform at the elevated position on the tree.

13. The shooting rest of claim 12 wherein at least one of the side rails is detachable from the tree for rotation relative to the front of the shooting rest to permit the occupant to mount and dismount the platform.

14. The shooting rest of claim 12 wherein the first and second posts and the side rails are hinged relative to the horizontal front shooting rail.

15. The shooting rest of claim 12 wherein the posts, the side rails and the front shooting rail are collapsible for transport and storage.

16. The shooting rest of claim 12 wherein the front shooting rail comprises a U-shaped member with a central section have a greater length than arms extending transversely relative to the central section.

* * * * *